United States Patent [19]

Kobayashi et al.

[11] Patent Number: 4,696,991
[45] Date of Patent: Sep. 29, 1987

[54] BLOCKED POLYISOCYANURATE

[75] Inventors: Yoshimichi Kobayashi; Hisaharu Hotta, both of Yokohama, Japan

[73] Assignee: Mitsubishi Chemical Industries Limited, Tokyo, Japan

[21] Appl. No.: 893,822

[22] Filed: Aug. 6, 1986

[30] Foreign Application Priority Data

Sep. 3, 1985 [JP] Japan ................. 60-194188

[51] Int. Cl.$^4$ ............................ C08G 18/80
[52] U.S. Cl. ..................... 528/45; 528/49; 544/193; 544/215
[58] Field of Search ............. 528/45, 49; 544/193, 544/215

[56] References Cited

U.S. PATENT DOCUMENTS 4,491,663  1/1985  Kordomenos et al. ............. 544/193
4,607,103  8/1986  Zamek et al. ...................... 544/193

Primary Examiner—Maurice J. Welsh
Attorney, Agent, or Firm—Oblon, Fisher, Spivak, McClelland & Maier

[57] ABSTRACT

A blocked polyisocyanurate having the formula:

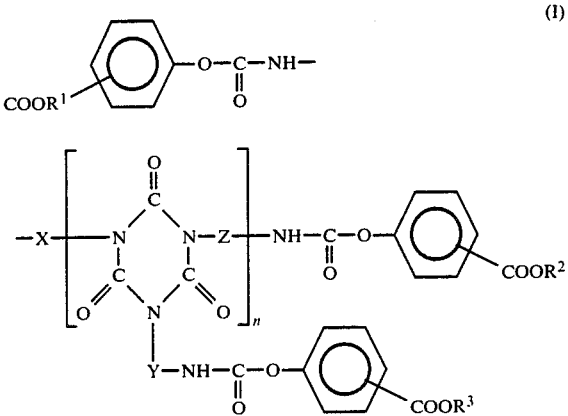

wherein each of X, Y and Z which may be the same or different, is a residue of a diisocyanate compound devoid of the isocyanate groups, each of $R^1$, $R^2$ and $R^3$ which may be the same or different, is a group selected from the group consisting of $C_1$–$C_{20}$ alkyl, alkoxyalkyl, aryl, alkaryl and aralkyl, and n is an integer of from 1 to 10.

3 Claims, No Drawings

BLOCKED POLYISOCYANURATE

The present invention relates to a blocked polyisocyanurate which is curable at a low temperature. More particularly, it relates to a blocked polyisocyanurate useful as a coating material, an adhesive or a cross-linking agent therefor, or as a modifier or cross-linking agent for polymers having active hydrogen atoms.

Urethane resins are usually prepared by a reaction between a component having an isocyanate group and a component having an active hydrogen group. In the fields of coatings and adhesives, a so-called two-part liquid system is employed wherein a curing agent having an isocyanate group and a resin having hydroxyl groups are mixed, coated and cured to form a coating film.

In this system, the reaction starts immediately upon mixing the two liquids, and therefore the usable life is relatively short and there exists a so-called pot time. On the other hand, blocked polyurethane are known wherein isocyanate groups are reacted with and protected by a blocking agent. Unless heated, they do not undergo a reaction even when they are mixed with a hydroxyl group-containing resin, and they are thus stable. Phenols, oximes, alcohols or lactams are commonly known as such blocking agents. However, none of them is fully satisfactory with respect to the curability at a low temperature, the odor of the blocking agent and properties of the cured resin (such as heat resistance, solvent resistance, adhesive strength, etc.).

It is an object of the present invention to provide a blocked polyisocyanurate which is stable and curable at a low temperature in a short period of time and which has good heat resistance.

The present invention provides a blocked polyisocyanurate having the formula:

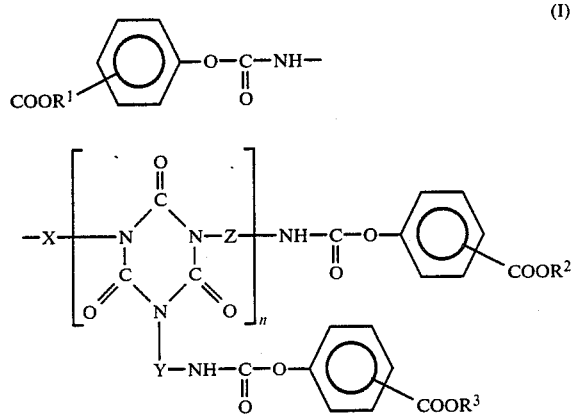

(I)

wherein each of X, Y and Z which may be the same or different, is a residue of a diisocyanate compound devoid of the isocyanate groups, each of $R^1$, $R^2$ and $R^3$ which may be the same or different, is a group selected from the group consisting of $C_1$–$C_{20}$ alkyl, alkoxyalkyl, aryl, alkaryl and aralkyl, and n is an integer of from 1 to 10.

Now, the present invention will be described in detail with reference to the preferred embodiments.

The blocked polyisocyanurate of the present invention may be prepared by (A) a process wherein a polyisocyanate compound having isocyanurate rings is reacted with a compound having the formula:

(II)

wherein R is the same as $R^1$, $R^2$ and $R^3$ of the compound of the formula I, and is a group selected from the group consisting of $C_1$–$C_{20}$ alkyl, alkoxyalkyl, aryl, alkaryl and aralkyl; (B) a process wherein a polyisocyanate and a compound of the formula II are reacted so that isocyanate groups remain, followed by isocyanuration; and (C) a process wherein the reaction of the polyisocyanate and the compound of the formula II and the isocyanuration are conducted simultaneously.

Now, the method for the preparation of the blocked polyisocyanurate of the present invention will be described in detail with reference to the first process.

In the present invention, the polyisocyanate compound having isocyanurate rings is a product obtained by subjecting an aromatic diisocyanate, an aliphatic diisocyanate, an alicyclic diisocyanate or a mixture thereof, to an isocyanuration reaction. As the polyisocyanate compound having isocyanate groups, a polyurethane obtained by reacting a diisocyanate compound with a polyfunctional polyhydroxy compound is most common. However, a blocked product of such a polyurethane is poor in the heat resistance, and there will be problems of coloring, odor, foaming, etc. when it is heated.

Whereas, the polyisocyanurate according to the present invention is excellent in the heat resistance, and does not have such problems.

The polyisocyanurate is prepared usually by a method wherein a catalyst is added to a diisocyanate to form an isocyanurate, and then, if necessary, an excess diisocyanate monomer is removed.

The diisocyanate includes an aromatic diisocyanate, an aliphatic diisocyanate and an alicyclic diisocyanate.

As the aromatic diisocyanate, tolylene diisocyanate, diphenylmethane diisocyanate, xylylene diisocyanate or naphthalene diisocyanate may be mentioned. As the aliphatic diisocyanate, 1,6-hexane diisocyanate, 1,10-decamethylene diisocyanate, lysine diisocyanate or 2,4,4-trimethylhexamethylene diisocyanate may be mentioned. Likewise, as the alicyclic diisocyanate, 3-isocyanatomethyl-3,5,5-tri-methylcyclohexyl isocyanate or 1,4-cyclohexane diisocyanate.

As the catalyst, an alkali metal salt of an organic carboxylic acid, a tertiary amine compound, a quaternary ammonium compound, an epoxy-amine compound or a phenolamine compound may be mentioned.

The reaction is conducted usually at a temperature of from 0° to 150° C. The removal of the monomer is conducted preferably by extraction or by a thin layer evaporation method. The resulting polyisocyanurate has a degree of polymerization represented by n=1 to 10 (statistical average number) in the formula I. If n is greater than 10, the molecular weight tends to be too high, whereby the compatibility with the solvent or with other resins tends to decrease and there will be practical problems.

Various studies have been made to develop a blocked polyisocyanurate capable of being cured at a low temperature in a short period of time by using such a polyisocyanurate and taking advantage of its heat resistance, and it has been found that the compound of the formula II is extremely effective as the blocking agent. The present invention has been accomplished on the basis of this discovery.

As the compound of the formula II, an o-oxybenzoic acid ester, a m-oxybenzoic acid ester, a p-oxybenzoic acid ester and a mixture thereof, may be mentioned. Particularly preferred among them is a p-oxybenzoic acid ester. A compound having a melting point of at most 50° C., preferably at most 40° C. is suitable. A compound having a melting point of higher than 50° C., tends to have poor solubility in a solvent, and the curing reaction is slow, and such a compound is likely to remain, after the dissociation from the polyisocyanurate, in the form of a powder in the cured resin, whereby the transparency or mechanical properties of the cured resin tend to be inferior.

The compound of the formula II according to the present invention is liquid at room temperature, and after the curing reaction, it is present uniformly in the cured resin and functions effectively as a plasticizer, whereby there will be no such drawbacks as the deterioration of the properties of the resin.

The length of R in the compound of the formula II affects the melting point. For the compound to be liquid, the length of R tends to increase in the order of o-substitution, m-substitution and p-substitution. In the case of m- or p-substitution, R is preferably a long chain alkyl group such as n-heptyl, n-octyl, 2-ethylhexyl, nonyl or dodecy, or a long chain alkoxyalkyl group including oxyethylene or oxypropylene groups. In the case of o-substitution, R is preferably methyl, ethyl, isopropyl, isoamyl, n-butyl, isobutyl, sec-butyl, n-heptyl, n-octyl, 2-ethylhexyl, nonyl, dodecyl, phenyl, benzyl or an alkoxyalkyl group including oxyethylene or oxypropylene groups. The number of carbon atoms or the total number of carbon and oxygen atoms, is preferably at least 4 so that the odor is minimum and the evaporation during the curing operation is little.

The reaction of the polyisocyanurate with the compound of the formula II as a blocking agent, is conducted preferably in a solvent inert to isocyanate groups. There is no particular restriction as to the reaction temperature. However, the reaction temperature is preferably from 20° to 100° C. A catalyst may be added to facilitate the reaction.

As the solvent, there may be mentioned an acetate such as ethyl acetate or butyl acetate; a ketone such as methyl ethyl ketone or methyl isobutyl ketone; a plasticizer for polyvinyl chloride such as dibutyl phthalate or dioctyl phthalate; an ether such as dioxane or tetrahydrofuran; an aromatic compound such as toluene or xylene; and dimethylformamide and N-methylpyrrolidone.

As the catalyst to facilitate the reaction, there may be mentioned a tin compound such as dibutyltin dilaurate, dioctyltin dilaurate or stannous octoate; a metal salt of naphthenic acid such as zinc naphthenate or cobalt naphthenate; acetylacetone iron; acetylacetone manganese; and a tertiary amine compound. The catalyst is used usually in an amount of from 10 to 10,000 ppm relative to the entire composition for reaction.

Now, the second process will be described. The starting material diisocyanate, the blocking agent (compound of the formula II), the solvent, the catalyst, the method for the blocking reaction and the method for the isocyanating reaction, are all the same as in the first process.

The reaction of this process is conducted in such a manner that the diisocyanate and the compound of the formula II as a blocking agent are reacted so that isocyanate groups are in excess of the amount of the hydroxyl groups of the blocking agent, and then the remaining isocyanate groups are completely isocyanurated by adding and reacting an isocyanurate catalyst. The NCO/OH ratio in the first reaction of the diisocyanate with the compound of the formula II is preferably from 1.5 to 4. If the ratio is less than 1.5, the content of isocyanurate rings in the final product tends to be small, whereby there will be problem in the heat resistance, etc. On the other hand, if the ratio exceeds 4, the content of the blocked isocyanate groups decreases, whereby the function as a cross-linking agent during the curing operation tends to decrease.

As another process, there is a process wherein the diisocyanate, the blocking agent (compound of the formula II) and the solvent are mixed, and then the blocking and the isocyanuration are conducted simultaneously in the presence of both the above-mentioned urethane-forming catalyst (to facilitate the reaction of the isocyanate groups and the hydroxyl groups) and the isocyanurating catalyst. However, with a view to efficient control of the reaction and the product, the preceding two processes are preferred to this process.

The blocked polyisocyanurate thus obtained is capable of forming a three dimensional resin when mixed with an active hydrogen-containing resin and heated for cross-linking (curing).

Now, the present invention will be described in further detail with reference to Examples. However, it should be understood that the present invention is by no means restricted by these specific Examples.

EXAMPLE 1

Into a four necked flask equipped with a thermometer, a condenser, a stirrer and a dropping funnel, 147 g of 80-TDI (tolylene diisocyanate comprising 80% of 2,4-isomer and 20% of 2,6-isomer) and 406 g of dibutyl phthalate were introduced. The internal temperature was adjusted to 30° C., and 2.0 g of a 5% methanol solution of potassium acetate was gradually dropwise added under stirring. Then, the reaction was conducted at a temperature of from 30° to 40° C. for 12 hours to obtain a polyisocyanurate having isocyanate groups at the terminals. The isocyanate group content of this product was 4.92% (the isocyanate group content at the initiation of the reaction was 14.5%), and in the infrared absorption spectrum, an absorption was observed at 1410 cm$^{-1}$ attributable to the vibration of the isocyanurate ring. Further, from the measurement by gel permeation chromatography (GPC), the number average molecular weight was found to be 1400.

Then, the internal temperature of the flask was adjusted to 60° C., and 0.5 g of dibutyltin dilaurate was added and uniformly mixed and dissolved.

Then, a solution obtained by dissolving 170 g of p-oxybenzoic acid 2-ethylhexyl ester in 386 g of dibutyl phthalate, was dropwise added over a period of 1 hour, and the reaction was conducted at a temperature of from 60° to 65° C. for 8 hours. From the infrared absorption specturm for detection of isocyanate groups, no absorption was observed at 2250 cm$^{-1}$.

The blocked polyisocyanurate thus obtained had an effective isocyanate group content of 2.51%. The blocked polyisocyanurate and a polyester polyol were mixed in a ratio as identified in Table 1, and the mixture was coated on a glass sheet, whereby the curing rate was confirmed. The results are shown in Table 1. It was found that the curing could be conducted at a low temperature for a short period of time.

EXAMPLE 2

Into a four necked flask equipped with a thermometer, a condenser, a stirrer and a dropping funnel, 250 g of MDI (4,4'-diphenylmethane diisocyanate) and 750 g of dioctyl phthalate were introduced. The internal temperature was adjusted to 60° C., and a solution comprising 0.5 g of dibutyltin dilaurate, 250 g of p-oxybenzoic acid 2-ethylhexyl ester and 750 g of dioctyl phthalate, was dropwise added and reacted over a period of 2 hours. Then, reaction was continued for 4 hours, and when the isocyanate group content became 2.1% (i.e. 50% of the isocyanate groups at the time of charging), 4.0 g of a 5% methanol solution of potassium acetate as an isocyanurating catalyst, was dropwise added. Then, the reaction was conducted at a temperature of 60° C. for about 10 hours until isocyanate groups were no longer detected by infrared absorption spectrum (2250 cm$^{-1}$). In this spectrum, an absorption at 1410 cm$^{-1}$ attributable to the vibration of an isocyanurate ring was observed.

The number average molecular weight was measured by GPC, and was found to be 2500. This product had an effective isocyanate group content of 2.1%. The curing rate was examined in the same manner as in Example 1 and found to be as shown in Table 1. It was found that curing could be conducted at a low temperature for a short period of time.

EXAMPLE 3

Into a four necked flask equipped with a thermometer, a condenser, a stirrer and a dropping funnel, 400 g of hexamethylene diisocyanate was introduced. The internal temperature was adjusted to 50° C, and 1.0 g of N,N,N-trimethyl-N-(2-hydroxyethyl)ammonium was added and mixed. The heat generation was suppressed by cooling, and while maintaining the internal temperature at a level of 60° C., the reaction was continued for 3 hours, whereupon the isocyanate group content became 35.0%. To this reaction solution, 1.5 g of phosphoric acid was added as a terminating agent. After stirring the reaction solution for one hour, the remaining hexamethylene diisocyanate was removed by a thin layer distillation apparatus. The solution thus obtained had an isocyanate group content of 21.5%, and in the infrared absorption spectrum, an absorption at 1680 cm$^{-1}$ and 1470 cm$^{-1}$ attributable to an isocyanurate ring was observed. Further, from the measurement by GPC, the number average molecular weight was found to be 830.

100 g of the polyisocyanurate thus obtained and 100 g of dioctyl phthalate were introduced into a separate reactor, and the internal temperature was adjusted to 60° C. A solution comprising 121 g of p-hydroxybenzoic acid n-heptyl ester, 121 g of dioctyl phthalate and 0.1 g of dibutyltin dilaurate, was dropwise added over a period of 1 hour, and the reaction was conducted at 60° C. for 6 hours to complete the blocking reaction. The blocked polyisocyanurate thus obtained had an effective isocyanate group content of 4.9%.

The curing rate was examined in the same manner as in Example 1. The results are shown in Table 1.

EXAMPLE 4

Into a four necked flask equipped with a thermometer, a condenser, a stirrer and a dropping funnel, 500 g of 3-isocyanatomethyl-3,5,5-trimethylhexyl isocyanate was introduced, and the internal temperature was adjusted to 65° C. Then, 2.0 g of N,N,N-trimethyl-N-(2-hydroxyethyl)ammonium was added and mixed. The reaction was exothermic, and therefore the reaction was conducted under cooling at 70° C. for 3 hours, whereupon the isocyanate group content became 26.5%.

To this reaction solution, 3.0 g of phosphoric acid was added as a terminating agent. After stirring the mixture for 1 hour, the remaining 3-isocyanatomethyl-3,5,5-trimethylhexyl isocyanate was removed by a thin layer distillation apparatus. The isocyanate group content of the obtained product was 17.2%, and in the infrared absorption spectrum, an absorption at 1690 cm$^{-1}$ and 1440 cm$^{-1}$ attributable to an isocyanurate ring was observed. Further, from the measurement by GPC, the number average molecular weight was found to be 720.

100 g of the polyisocyanurate thus obtained and 100 g of dioctyl phthalate were introduced into a separate reactor, and the internal temperature was adjusted to 70° C. A solution comprising 95 g of o-hydroxylbenzoic acid isoamyl ester, 95 g of dioctyl phthalate and 0.2 g of dibutyltin dilaurate, was dropwise added over a period of 1 hour, and the reaction was conducted at 70° C. for 8 hours to complete the blocking reaction.

The effective isocyanate group content in the blocked polyisocyanurate was 4.4%.

The curing rate was examined in the same manner as in Example 1. The results are shown in Table 1.

TABLE 1

|  | Example 1 | Example 2 | Example 3 | Example 4 |
|---|---|---|---|---|
| Composition |  |  |  |  |
| Blocked polyisocyanurate | 35 g | 40 g | 16 g | 15 g |
| Polyester polyol*1 | 10 g | 10 g | 10 g | 10 g |
| Curing test*2 |  |  |  |  |
| 90° C. × 15 min | X | △ | — | — |
| 100° C. × 15 min | ○ | ○ | X | X |
| 120° C. × 15 min | ◎ | ◎ | ○ | ○ |
| 140° C. × 15 min | ◎ | ◎ | ◎ | ◎ |
| 200° C. × 5 min | ◎ | ◎ | ◎ | ◎ |
| Foaming | None | None | None | None |
| Coloring | None | None | None | None |
| Odor | None | None | None | None |

*1Polyester polyol Y-52-13, manufactured by Asahi Denka, OH value: 56
*2Curing test
The sample was dipped in acetone, and the change in the state of the coating layer was observed.
◎ : No change
○: No substantial change
△: Swelled
X: Dissolved Conventional blocked polyurethanes require a high temperature and long time treatment for cross-linking. Whereas, the blocked polyisocyanurate of the present invention forms adequate cross-linking even at a low temperature. Further, under a high temperature heating at a level of e.g. at least 180° C., the cross-linkage will be formed in a short period of time at a level of 1 minute. Besides, even when heated at a high temperature at a level of about 200° C., it does not bring about phenomena such as coloring and foaming as in the case of the blocked polyurethane, and thus useful for blending with a thermoplastic material such as a polyvinyl chloride.

The blocked polyisocyanurate of the present invention is useful as a coating material, an adhesive, a curing agent for an ink, plastics or rubber, a modifier for paper and fibers or an impregnation treating agent (binder) for a wood and inorganic shaped product.

What is claimed is:

1. A blocked polyisocyanurate having the formula:

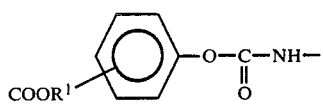

(I)

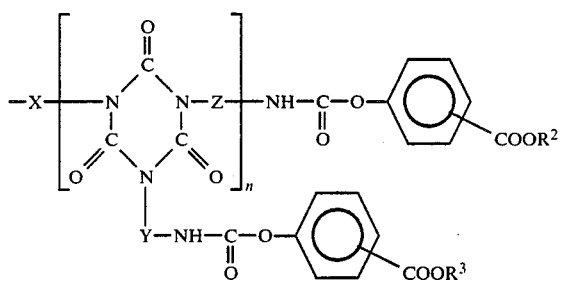

wherein each of X, Y and Z which may be the same or different, is a residue of a diisocyanate compound devoid of the isocyanate groups, each of $R^1$, $R^2$ and $R^3$ which may be the same or different, is a group selected from the group consisting of $C_1$–$C_{20}$ alkyl, alkoxyalkyl, aryl, alkaryl and aralkyl, and n is an integer of from 1 to 10.

2. The blocked polyisocyanurate according to claim 1, wherein the diisocyanate compound is selected from the group consisting of tolylene diisocyanate, diphenylmethane diisocyanate, xylylene diisocyanate naphthalene diisocyanate, 1,6-hexane diisocyanate, 1,10-decamethylene diisocyanate, lysine diisocyanate, 2,4,4-trimethylhexamethylene diisocyanate, 3-isocyanatomethyl-3,5,5-trimethylcyclohexyl isocyanate and 1,4-cyclohexane diisocyanate.

3. A process for preparing a blocked polyisocyanurate having the formula:

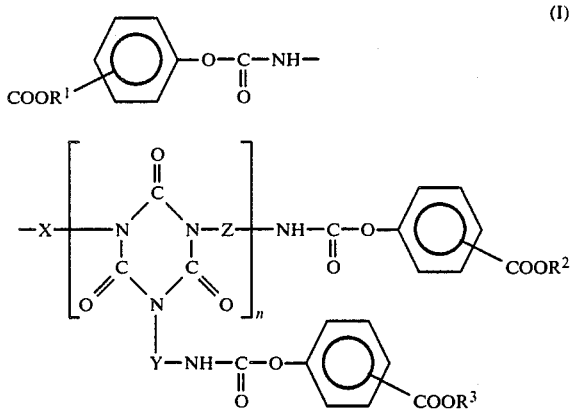

wherein each of X, Y and Z which may be the same or different, is a residue of a diisocyanate compound devoid of the isocyanate groups, each of $R^1$, $R^2$ and $R^3$ which may be the same or different, is a group selected from the group consisting of $C_1$–$C_{20}$ alkyl, alkoxyalkyl, aryl, alkaryl and aralkyl, and n is an integer of from 1 to 10, which comprises:

(A) reacting a polyisocyanate compound having isocyanurate rings with a compound having the formula:

(II)

wherein R is a group selected from the group consisting of $C_1$–$C_{20}$ alkyl, alkoxyalkyl, alkaryl and aralkyl;

(B) reacting a polyisocyanate with a compound of the formula II so that isocyanate groups remain, followed by isocyanuration; or (C) conducting the reaction of a polyisocyanate with a compound of the formula II and the isocyanuration simultaneously.

* * * * *